United States Patent
Bergeron et al.

(10) Patent No.: US 9,981,752 B2
(45) Date of Patent: May 29, 2018

(54) LIQUID TANK SYSTEM WITH OVER PRESSURE PROTECTION

(71) Applicant: PRATT & WHITNEY CANADA CORP., Longueuil (CA)

(72) Inventors: Sebastien Bergeron, Chambly (CA); Pierre Gauvin, St-Bruno (CA); Johnny Vinski, Chateauguay (CA); Genevieve McMurray, Mont St-Hilaire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 64 days.

(21) Appl. No.: 15/277,640

(22) Filed: Sep. 27, 2016

(65) Prior Publication Data

US 2018/0086475 A1    Mar. 29, 2018

(51) Int. Cl.
| | |
|---|---|
| *F16K 24/00* | (2006.01) |
| *B64D 37/08* | (2006.01) |
| *B65D 90/34* | (2006.01) |
| *B64D 37/14* | (2006.01) |
| *B64D 37/32* | (2006.01) |

(52) U.S. Cl.
CPC ............ *B64D 37/08* (2013.01); *B64D 37/14* (2013.01); *B64D 37/32* (2013.01); *B65D 90/34* (2013.01); *Y10T 137/86324* (2015.04)

(58) Field of Classification Search
CPC ......... B64D 37/08; B64D 37/14; B65D 90/34
USPC ..................................... 137/587, 43; 141/52
See application file for complete search history.

(56) References Cited

U.S. PATENT DOCUMENTS

| | | | |
|---|---|---|---|
| 2,610,705 A | 9/1952 | Kirkbride et al. | |
| 3,586,016 A * | 6/1971 | Meyn | B65D 90/34 137/199 |
| 4,346,786 A | 8/1982 | Midgley | |
| 4,531,358 A | 7/1985 | Smith | |
| 4,770,677 A * | 9/1988 | Harris | B60K 15/03504 141/286 |
| 5,392,804 A * | 2/1995 | Kondo | B60K 15/03519 123/519 |

(Continued)

*Primary Examiner* — Umashankar Venkatesan
(74) *Attorney, Agent, or Firm* — Norton Rose Fulbright Canada LLP (57) ABSTRACT

A liquid tank system comprises a main liquid tank, an outlet communicating between a fluid circuit and the main liquid tank, an inlet communicating between the fluid circuit and the main liquid tank, and an auxiliary cavity. First vent passage and second vent passage(s) communicate between the main liquid tank and the auxiliary cavity and allows liquid and gas to flow from the main liquid tank to the auxiliary cavity. The second vent passage has a flow control device regulating flow through the second vent passage and having a set point at which it allows liquid and gas to flow from the main liquid tank to the auxiliary cavity only when a pressure in the main liquid tank is beyond a threshold. The liquid tank system has an attitude envelope in which the liquid tank system is configured such that, in use, the flow control device blocks flow through the second vent passage when an end of the first vent passage in the main liquid tank is above a liquid level, and the flow control device allows gas and/or fluid flow through the second vent passage when main fluid tank pressure is above the threshold and the end of the first vent passage in the main liquid tank is below the liquid level.

20 Claims, 4 Drawing Sheets

(56) References Cited

U.S. PATENT DOCUMENTS

| | | | | |
|---|---|---|---|---|
| 5,404,906 | A | * | 4/1995 | Aoshima .......... B60K 15/03504 |
| | | | | 123/519 |
| 5,462,100 | A | * | 10/1995 | Covert ............. B60K 15/03504 |
| | | | | 137/43 |
| 5,687,778 | A | | 11/1997 | Harris |
| 5,860,458 | A | * | 1/1999 | Benjey ............. B60K 15/03519 |
| | | | | 137/202 |
| 6,394,123 | B2 | | 5/2002 | Hemmer |
| 6,834,686 | B2 | * | 12/2004 | Gray ....................... B67D 7/78 |
| | | | | 141/290 |
| 6,863,095 | B2 | * | 3/2005 | Osaki ............... B60K 15/03504 |
| | | | | 141/198 |
| 8,181,746 | B2 | | 5/2012 | Szolomayer et al. |
| 8,256,458 | B2 | | 9/2012 | Angst |
| 8,312,969 | B2 | | 11/2012 | Hoang |
| 8,978,829 | B2 | | 3/2015 | Mccune et al. |
| 9,186,982 | B2 | * | 11/2015 | Baldwin .............. B60K 15/035 |
| 9,347,335 | B2 | | 5/2016 | Laigle et al. |

* cited by examiner

LIQUID TANK SYSTEM WITH OVER PRESSURE PROTECTION

TECHNICAL FIELD

The present application related to liquid tank systems used in attitude change applications.

BACKGROUND OF THE ART

Liquid tanks may conventionally be provided with vents to regulate pressure and/or to avoid an over-pressurization of the tank. However, when liquid tanks undergo significant attitude variations, the vents may become submerged by the liquid, which impedes the normal operation of the vents and may thus impact the pressure regulation or over-pressurization protection. Hence, the attitude envelope capability of some apparatuses may be affected by these tank pressurization issues. Among the solutions used to address attitude envelope limitations are that tank volumes have been increased and/or complex mechanisms such as flip-flop valves have been developed.

SUMMARY

In one aspect, there is provided a liquid tank system comprising: a main liquid tank, at least an outlet communicating between a fluid circuit and the main liquid tank, at least one inlet communicating between the fluid circuit and the main liquid tank, an auxiliary cavity, a first vent passage communicating between the main liquid tank and the auxiliary cavity and configured to allow liquid and gas to flow at least from the main liquid tank to the auxiliary cavity, and at least one second vent passage communicating between the main liquid tank and the auxiliary cavity and configured to allow liquid and gas to flow at least from the main liquid tank to the auxiliary cavity, the at least one second vent passage having a flow control device configured to regulate flow through the at least one second vent passage, the flow control device having a set point at which it allows liquid and gas to flow from the main liquid tank to the auxiliary cavity only when a pressure in the main liquid tank is beyond a threshold, the liquid and gas flowing through the first vent passage below the threshold, wherein the liquid tank system has an attitude envelope in which the liquid tank system is configured such that, in use, the flow control device blocks flow through the at least one second vent passage when an end of the first vent passage in the main liquid tank is above a liquid level, and the flow control device allows gas and/or fluid flow through the at least one second vent passage when main fluid tank pressure is above the threshold and the end of the first vent passage in the main liquid tank is below the liquid level.

In another aspect, there is provided a method for reducing a gas pressure in a main liquid tank in fluid communication with an auxiliary cavity by a first vent passage and at least a second vent passage, comprising: venting the main liquid tank with the first vent passage and blocking the at least one second vent passage with a flow control device when an end of the first vent passage in the main liquid tank is above a liquid level, and opening the flow control device to allow gas or liquid flow through the at least one second vent passage when pressure in the main liquid tank is above a pressure threshold and the end of the first vent passage in the main liquid tank is below a liquid level.

In a further aspect, there is a liquid tank system comprising: a main liquid tank, at least an outlet communicating between a fluid circuit and the main liquid tank, at least one inlet communicating between the fluid circuit and the main liquid tank, an auxiliary cavity, a first vent passage communicating between the main liquid tank and the auxiliary cavity configured for liquid and gas to flow at least from the main liquid tank to the auxiliary cavity, and at least one second vent passage communicating between the main liquid tank and the auxiliary cavity and configured for liquid and gas to flow at least from the main liquid tank to the auxiliary cavity, the at least one second vent passage having a flow control device configured to regulate flow the at least one second vent passage, the flow control device having a set point at which it allows liquid and gas to flow from the main liquid tank to the auxiliary cavity only when a pressure in the main liquid tank is beyond a threshold, the liquid and gas flowing through the first vent passage below the threshold, wherein the liquid tank system has an attitude envelope in which the liquid tank system, in use, is vented in three modes, a first mode in which the flow control device blocks the at least one second vent passage with when an end of the first vent passage in the main liquid tank is above the liquid level, a second mode in which the flow control device allows gas flow through the at least one second vent passage when the end of the first vent passage in the main liquid tank is below the liquid level, and a third mode in which the flow control device allows liquid flow through the at least one second vent passage when liquid pressure is above the threshold and the end of the first vent passage in the main liquid tank is below the liquid level.

DESCRIPTION OF THE DRAWINGS

Reference is now made to the accompanying figures in which.

DETAILED DESCRIPTION

Figure 1:
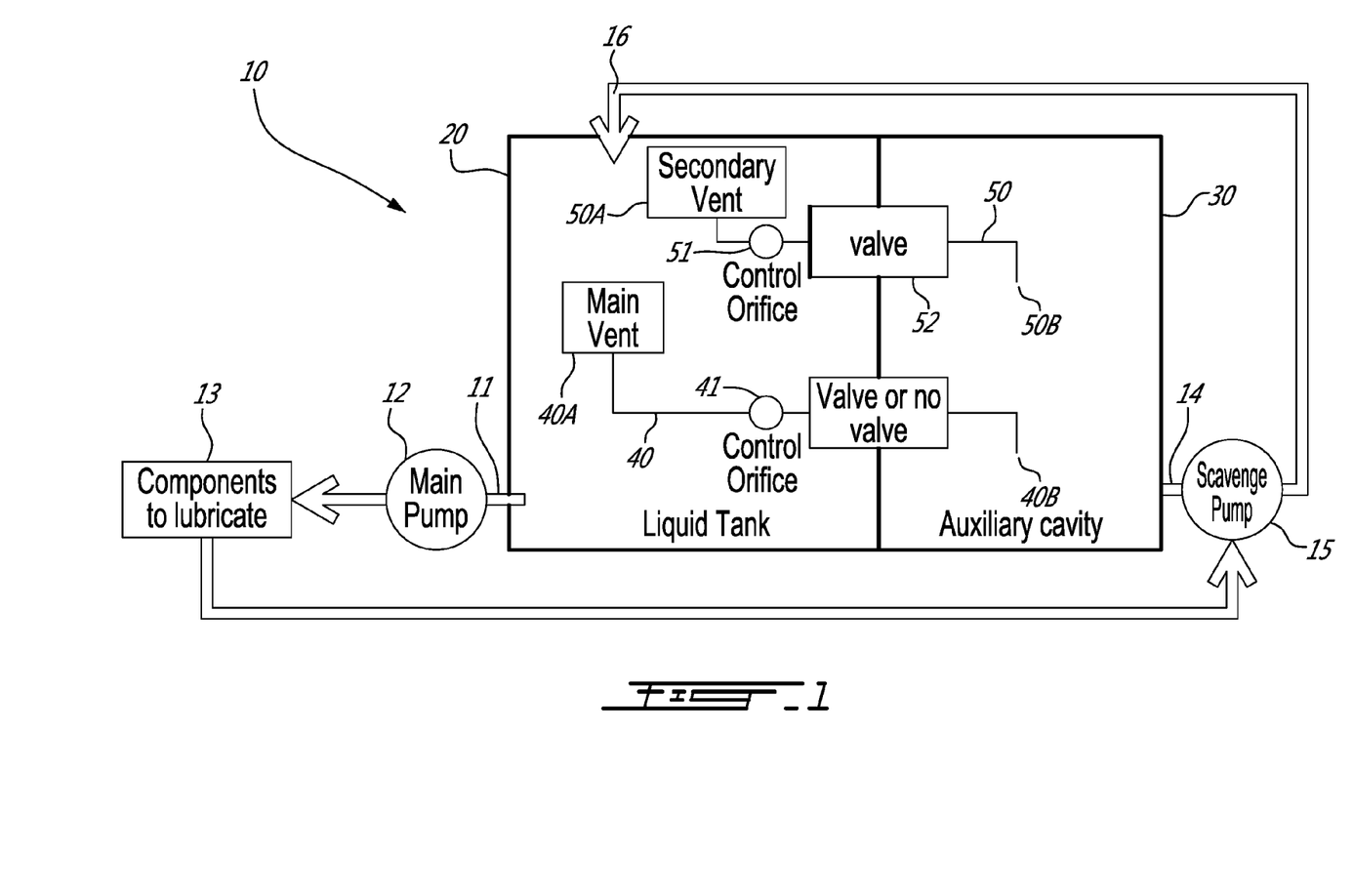
FIG. 1 is a schematic view of a liquid tank system with over pressure protection in accordance with the present disclosure.

Referring to the drawings and more particularly to FIG. 1, a liquid tank system in accordance with the present disclosure is generally shown at 10. The liquid tank system 10 may be part of a closed loop system storing a liquid to be supplied to components of a fluid system. The liquid may then be returned to the liquid tank system 10 as part of the closed loop. In an embodiment, the liquid may be oil used for lubricating purposes, but other types of liquid may be used, such as fuel.

By way of example, the liquid tank system 10 has an outlet 11 in which a main pump 12 pumps the liquid to components 13—the expression outlet is used as it is the passage through which the liquid exits the tank system 10, but it may also be known as an inlet in other circumstances. The liquid tank system 10 may also have an outlet 14 in which a scavenge pump 15 collects and directs to an inlet 16 of the liquid tank system 10—the expression inlet is used as it is the passage through which the liquid exits the tank system 10, but it may also be known as an outlet in other circumstances. The liquid tank system 10 is part of an apparatus that has an attitude envelope, whereby the liquid tank system 10 may be said to operate in an attitude envelope. The attitude envelop is the attitude range in which the liquid tank system 10 is rated to operate, in spite of orientation variations of the apparatus.

For example, the liquid tank system 10 may be used in aerobatic planes, in tilt rotors, known to operate in large attitude envelopes in contrast to other aircraft. However, the liquid tank system 10 may also be found in other types of apparatuses or vehicles, such as all-terrain vehicles, watercraft, to name but a few examples, especially those that operate in an attitude envelope.

The liquid tank system 10 has a main tank 20, and auxiliary tank or cavity 30, a first vent passage 40, and one or more secondary vent passage 50.

The main tank 20 is used as storage for the liquid. The main tank 20 is a closed cavity of fixed volume (a.k.a., fixed size liquid tank), i.e., it is not an open tank. The auxiliary tank 30 provides auxiliary storage capacity in the event of over pressurization of the main tank 20, as described hereinafter. In an embodiment, the auxiliary tank 30 may be part of a component using the liquid, such as a gear box (e.g., auxiliary gear box) and may be vented. Even though the auxiliary tank 30 is referred to as a tank, it may be a sealed cavity that is part of the main tank 20, with flow from the tank 20 to the tank 30 permitted only through the vent passages 40 and 50.

The vent passages 40 and 50 are used to regulate pressure in the main tank 20, and to relieve the main tank 20 from over pressurization when necessary. The vent passages 40 and 50 therefore allow fluid flow from the main tank 20 to the auxiliary tank 30, and may be provided with flow restricting devices in order to control, regulate and/or limit the flow from the tank 20 to the tank 30 according to modes of operation described hereinafter.

The first vent passage 40 may be an open passage having an inlet end 40A in the main tank 20, and an outlet end 40B in the auxiliary tank 30. By open passage, the first vent passage 40 may be continuously or permanently open, in that it does not have any obstruction selectively blocking its channel. The first vent passage 40 may also have a controlled orifice 41, valve(s) or like flow control devices between the ends 40A and 40B to control the flow rate through the first vent passage 40. The secondary vent passage 50 also defines a passage from the main tank 20 to the auxiliary tank 30, with an inlet end 50A in the main tank 20, and an outlet end 50B in the auxiliary tank 30. The secondary vent passage 50 may have a controlled orifice 51, valve(s) 52 or like flow control devices to control the flow rate through the secondary vent passage 50. The valve 52 is selected to have a set point related to an opening or cracking pressure that is higher than a pressure at which flow normally occurs in the first vent passage 40, so as to selectively open when pressure in the main tank 20 is only above a given pressure threshold. The flow control device 52 may be any type of valve, such as a check valve, a solenoid valve, an electronic valve etc, configured to automatically open when a pressure threshold is reached. The flow control device 52 may open progressively or not.

For example, in an embodiment, the first vent passage 40 is configured to allow free flow of fluids between the tanks 20 and 30, whereas the second vent passage 50 only allows flow of fluids from the tank 20 to the tank 30 when a threshold fluid pressure is reached in the tank 20, to relieve the tank 20 from over pressure. Even though FIG. 1 shows a single secondary vent passage 50, two or more of the secondary vent passage 50 may be present in the liquid tank system 10, to increase the coverage of pressure relief and thus the attitude envelope of the liquid tank system 10.

The vent passages 40 and 50 are located and configured to enable three distinct modes of pressure regulation for the liquid tank system 10, within the attitude envelope, to avoid over pressurization of the main tank 20 in spite of attitude changes of the main tank 20. The vent passages operate independently from each other using different cracking pressures and therefore open sequentially depending on the pressure.

Figure 2A:
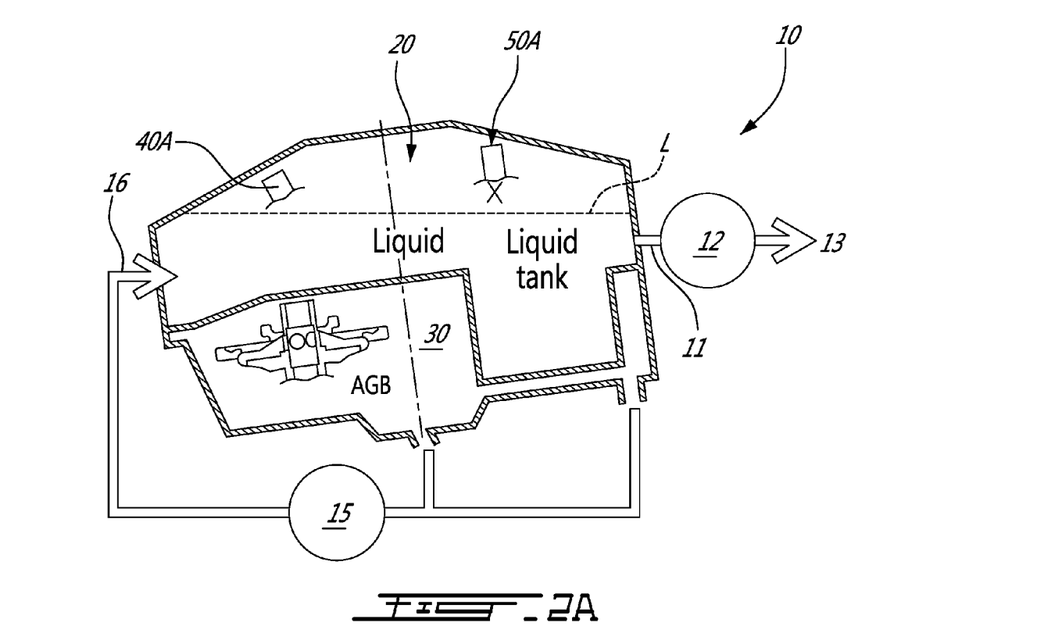
FIG. 2A is a schematic view of the liquid tank system of FIG. 1 in a first mode of operation, the liquid tank system being in a vertical orientation.
Figure 2B:
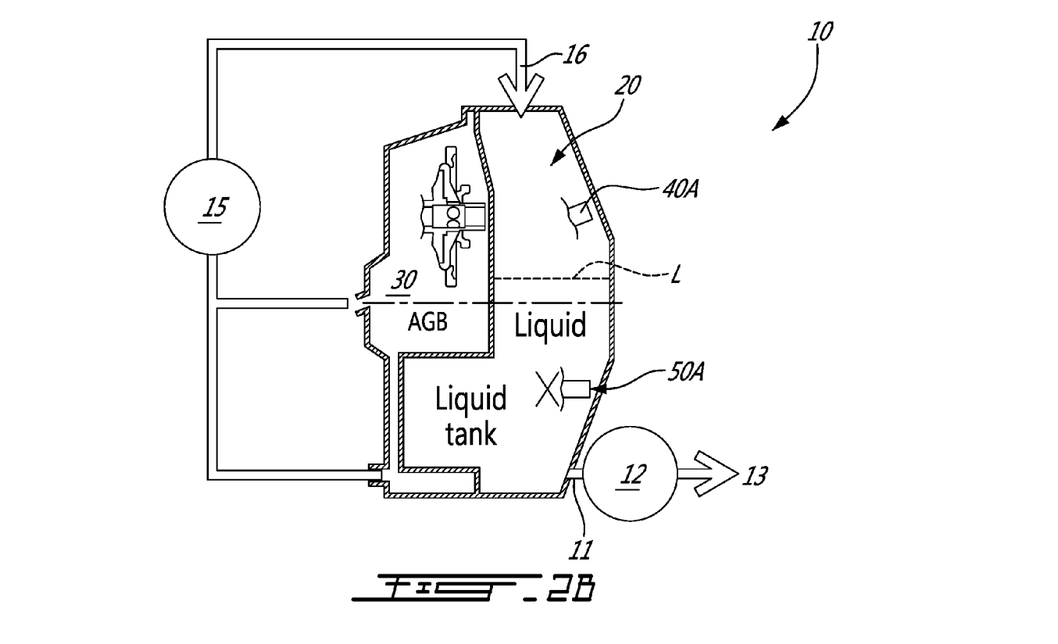
FIG. 2B is a schematic view of the liquid tank system of FIG. 1 in the first mode of operation, the liquid tank system being in a horizontal orientation.
Figure 3A:
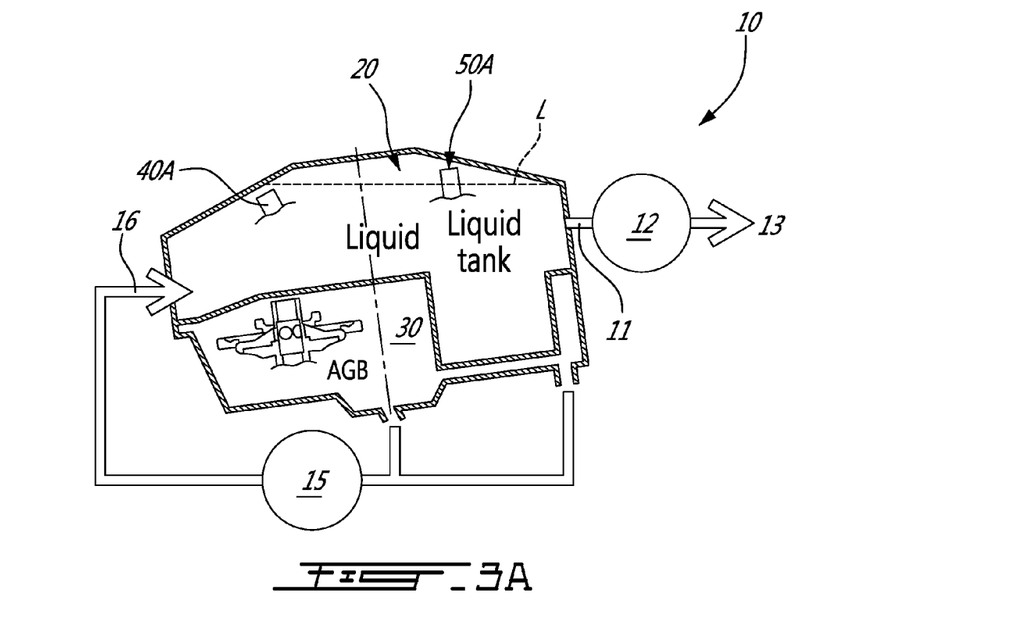
FIG. 3A is a schematic view of the liquid tank system of FIG. 1 in a second mode of operation, the liquid tank system being in a vertical orientation.
Figure 3B:
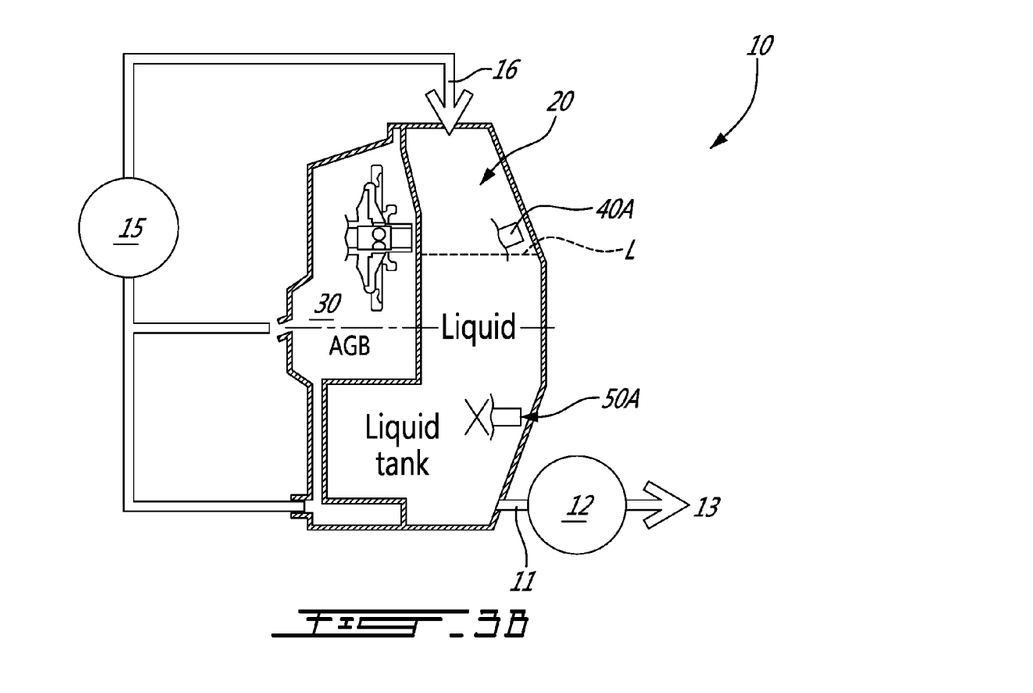
FIG. 3B is a schematic view of the liquid tank system of FIG. 1 in the second mode of operation, the liquid tank system being in a horizontal orientation.
Figure 4A:
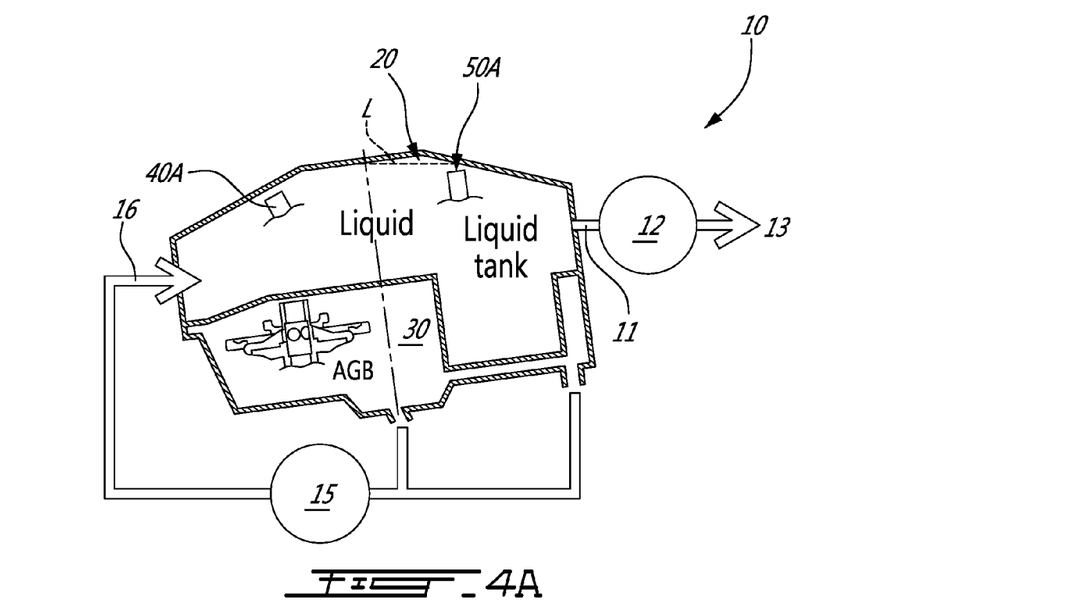
FIG. 4A is a schematic view of the liquid tank system of FIG. 1 in a third mode of operation, the liquid tank system being in a vertical orientation.
Figure 4B:
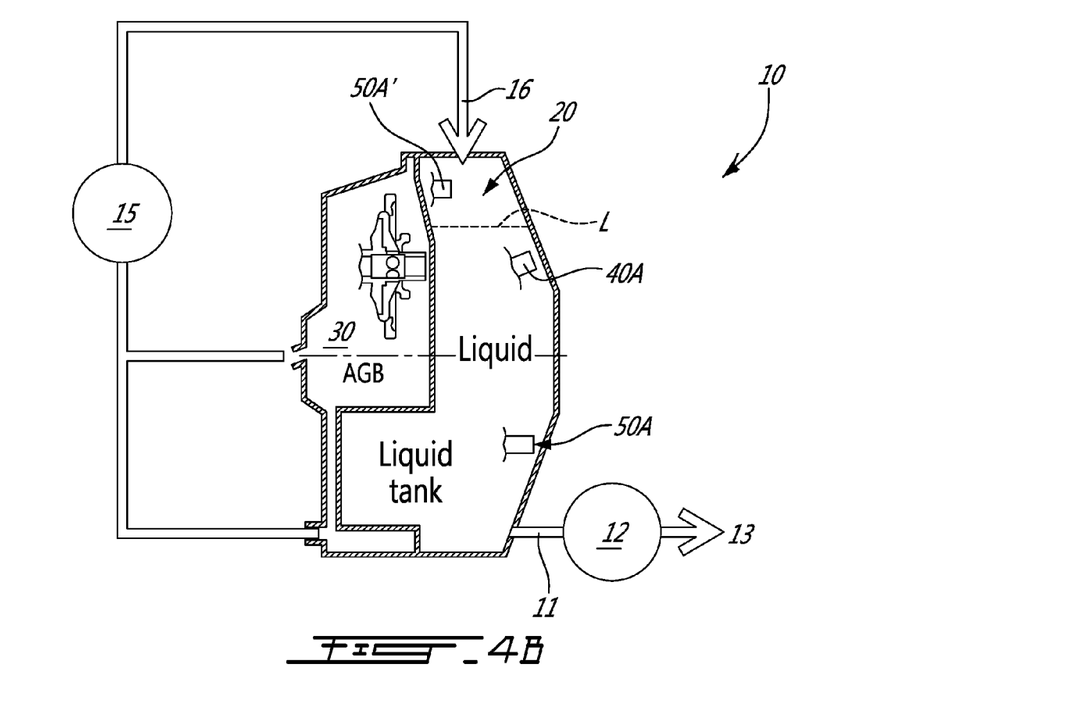
FIG. 4B is a schematic view of the liquid tank system of FIG. 1 in the third mode of operation, the liquid tank system being in a horizontal orientation.

Referring to FIGS. 2A and 2B, a first of three modes is shown, FIGS. 3A-3B showing a second mode and FIGS. 4A-4B showing a third mode. The monikers "first", "second" and "third" are simply used to distinguish the modes from one another. For convention, the liquid level in the main tank 20 is shown at L, with a gas pocket being above the liquid level L. Although the expression "gas pocket" is used, the gas above the liquid level L may contain some vapour. In the attitude envelope of the liquid tank system 10, there must be sufficient liquid for the main pump 12 to supply fluid to the components 13 as required. Accordingly, as observed in FIGS. 2A-4B, the outlet 11 is under the liquid level L, regardless of the attitude of the liquid tank system 10, although the outlet 11 may be occasionally over the liquid level L, such as in a negative g condition.

Moreover, FIGS. 2A, 3A and 4A all show the main tank 20 in its vertical orientation, whereas FIGS. 2B, 3B and 4B all show the main tank 20 in a horizontal orientation, yet within the attitude envelope of the main tank 20. Moreover, for simplicity, the outlet ends 40B and 50B are not shown in FIGS. 2A-4B, but are present in the manner shown in FIG. 1.

FIRST MODE

In FIG. 2A, both of the inlets 40A and 50A are above the liquid level L. Therefore, the gas pocket is in fluid communication with the auxiliary tank 30 via the first vent passage 40. As a result, the gas pressure in the main tank 20 is maintained below the threshold pressure, and the secondary vent passage 50 remains closed, no gas passing through the secondary vent passage 50.

In FIG. 2B, an attitude variation causes the liquid tank system 10 to be horizontal. The inlet 40A remains above the liquid level L, but the inlet 50A is now below the liquid level L, and is thus submerged in the liquid. Therefore, the gas pocket is in fluid communication with the auxiliary tank 30 via the first vent passage 40. As a result, the gas pressure in the main tank 20 is maintained below the threshold pressure, and the secondary vent passage 50 is consequentially shut, no liquid passing through the secondary vent passage 50.

The first vent passage 40 is positioned in the tank 20 such that, when the inlet end 40A is in the gas pocket, the secondary vent passage(s) 50 is blocked by the flow control device 52. For example, the position is such that the gas pocket is large enough for the venting capacity of the first vent passage 40, the first vent passage 40 handling the venting without assistance from the secondary vent passage(s) 50.

SECOND MODE

In FIG. 3A, the inlet 40A is now below the liquid level L, and is thus submerged in the liquid, whereas the inlet 50A remains above the liquid level L. The first vent passage 40 may allow liquid to pass therethrough to reach the auxiliary tank 30, and hence lower the liquid level L. The gas pocket may be in fluid communication with the auxiliary tank 30 via the secondary vent passage 50. If the pressure of the gas pocket reaches the pressure threshold, the flow control device 52 opens to relieve the main tank 20. As a result, the main tank 20 is vented by the secondary vent passage 50 acting as pressure-relief mechanism. In the second mode, when the inlet end 40A is submerged as in FIG. 3A, the volume of the gas pocket is increased while excess pressure is being vented via the secondary vent passage 50, by the first vent passage 40's ability to allow fluid flow to the auxiliary tank 30.

In FIG. 3B, an attitude variation causes the liquid tank system 10 to be horizontal. The inlet 40A is now above the liquid level L, but the inlet 50A is now below the liquid level L, and is thus submerged in the liquid. Therefore, the gas pocket is in fluid communication with the auxiliary tank 30 via the first vent passage 40. As a result, the gas pressure in the main tank 20 is maintained below the threshold pressure by venting via the first vent passage 40, and the secondary vent passage 50 is consequentially shut, with no liquid passing through the secondary vent passage 50.

THIRD MODE

In FIG. 4A, both of the inlets 40A and 50A are below the liquid level L, and are thus submerged in the liquid. With such high liquid level, the volume available for the gas pocket is reduced, resulting in an increased gas pressure, and increased liquid pressure. Both of the vent passages 40 and 50 may allow liquid to pass therethrough to reach the auxiliary tank 30 (if the cracking point is reached for the device 52), and hence lower the liquid level L, until one of the inlets 40A and 50A is below the liquid level L and vents the main tank 20. The auxiliary tank 30 is therefore used as temporary liquid storage to reduce the pressure in the main tank 20.

In FIG. 4B, an attitude variation causes the liquid tank system 10 to be horizontal. Hence, as in FIG. 4A, both of the inlets 40A and 50A are below the liquid level L, and are submerged in the liquid. Again, the volume available for the gas pocket is reduced, resulting in an increased gas pressure, and increased liquid pressure. Both of the vent passages 40 and 50 allow liquid to pass therethrough to reach the auxiliary tank 30, and hence lower the liquid level L, until one of the inlets 40A and 50A is below the liquid level L and vents the main tank 20.

The liquid tank system 10 may have more than one of the secondary vent passages 50, independent from one another. The secondary vent passages 50 would have their inlet ends 50A strategically positioned at various locations in the main tank 20 to limit the instances in which all vents are submerged as in FIGS. 4A and 4B. For example, in FIG. 4B, the inlet end of another of the secondary vent passages 50 could be located at 50A', to act as a vent while the inlet ends 40A and 50A are submerged. The inlet end 50A' would be related to a flow control device (such as valve 52) having a cracking point above the operating pressure of the first vent passage 40. The cracking point of valves 52 of the two secondary vent passages 50 may be the same or different. Inlet ends 50A/50A' of the secondary vent passages 50 are therefore strategically positioned to cover complementary parts of the main tank 20, such that when one of the inlet ends 50A is submerged below the liquid level L simultaneously with the inlet end 40A, the other inlet end 50A' serves for overpressure protection. This may be described relative to the attitude envelope of the liquid tank system 10. It is first assumed that the liquid tank system 10 is at opposed end orientations of the attitude envelope in FIG. 4A (vertical orientation) and FIG. 4B (horizontal orientation). If the attitude envelope were divided in two parts, the vertical orientation (at a first end orientation) would be in a first part, and the horizontal orientation (at the second end orientation) would be in the second part. The vent passages 50 are arranged such that one inlet end 50A serves as vent or pressure-relief mechanism in the first part of the attitude envelope (a.k.a., first range of attitudes), and the other inlet end 50A' serves as vent or pressure-relief mechanism in the second part of the attitude envelope (a.k.a., second range of attitudes). The first part of the attitude envelope or first range of attitudes does not overlap the second part of the attitude envelope or second range of attitudes, they are separate and distinct from one another. Accordingly, the presence of a plurality (more than one) secondary vent passage 50 allows operation of the liquid tank system 10 in the second mode rather than in the third mode.

The attitude envelope capability may be adjusted by adjusting some of the parameters and size of the liquid tank system 10. For example, the number of vent passages, the position of the inlet ends of the vent passages in the main tank 20, the opening and/or cracking pressure of the flow control devices and the number of control orifices, and the pressure threshold.

Accordingly, the presence of the vent passages 40 and 50 in the manner described above may increase the attitude envelope capability and capacity of a liquid tank, in comparison to liquid tanks of similar volume, without the arrangement of vent passages 40 and 50 described herein. The multiple vent passages are located at specific locations in the tank to regulate the tank pressure within the entire attitude envelop by either controlling the gas flow or the amount of liquid transferred to the vented auxiliary cavity 30. The three modes automatically switch from one to the other, as a function of the attitude of the main tank 20 and of the liquid level in the tank, without requiring any human intervention. The use of the liquid tank system 10 may result in a smaller and lighter apparatuses, in comparison to apparatuses having an equivalent attitude envelope, but no vent passage arrangement as in the liquid tank system 10.

Therefore, the liquid tank system 10, or like tank system may operate in the following method for reducing a gas pressure in the main liquid tank 20: The outlet 11 of the main liquid tank 20 is continuously maintained below a liquid level in an attitude envelope of the main liquid tank 20, but with exception such as in a negative g condition. The main liquid tank 20 is vented with the first vent passage 40 and the secondary vent passage 50 is blocked with the flow control device 52 when the inlet end 40A of the first vent passage 40 is above a liquid level L in the main liquid tank 20. The flow control device 52 is opened to allow gas or liquid flow through the secondary vent passage(s) 50 when gas pressure in the main liquid tank 20 is above a pressure threshold and the inlet end 40A of the first vent passage 40 is below the liquid level L.

The above description is meant to be exemplary only, and one skilled in the art will recognize that changes may be made to the embodiments described without departing from the scope of the invention disclosed. For example, the system described above may be applied to gas turbine engines, such as those for aerobatic planes, tilt rotors, or any other apparatus or vehicle configured to operate in attitude changes. Still other modifications which fall within the scope of the present invention will be apparent to those skilled in the art, in light of a review of this disclosure, and such modifications are intended to fall within the appended claims.

The invention claimed is:

1. A liquid tank system comprising:
   a main liquid tank,
   at least an outlet communicating between a fluid circuit and the main liquid tank,
   at least one inlet communicating between the fluid circuit and the main liquid tank,
   an auxiliary cavity,
   a first vent passage communicating between the main liquid tank and the auxiliary cavity and configured to allow liquid and gas to flow at least from the main liquid tank to the auxiliary cavity, and
   at least one second vent passage communicating between the main liquid tank and the auxiliary cavity and configured to allow liquid and gas to flow at least from the main liquid tank to the auxiliary cavity, the at least one second vent passage having a flow control device configured to regulate flow through the at least one second vent passage, the flow control device having a set point at which it allows liquid and gas to flow from the main liquid tank to the auxiliary cavity only when a pressure in the main liquid tank is beyond a threshold, the liquid and gas flowing through the first vent passage below the threshold,
   wherein the liquid tank system has an attitude envelope in which the liquid tank system is configured such that, in use, the flow control device blocks flow through the at least one second vent passage when an end of the first vent passage in the main liquid tank is above a liquid level, and the flow control device allows gas and/or fluid flow through the at least one second vent passage when main fluid tank pressure is above the threshold and the end of the first vent passage in the main liquid tank is below the liquid level.

2. The liquid tank system according to claim 1, wherein the first vent passage allows liquid flow from the main liquid tank to the auxiliary cavity when the end of the first vent passage in the main liquid tank is below the liquid level.

3. The liquid tank system according to claim 2, wherein the at least one second vent passage allows liquid flow from the main liquid tank to the auxiliary cavity when the end of the first vent passage and an end of the at least one second vent passage in the main liquid tank are below the liquid level.

4. The liquid tank system according to claim 1, wherein the first vent passage is a continuously open passage.

5. The liquid tank system according to claim 1, wherein the auxiliary cavity is part of an auxiliary gear box.

6. The liquid tank system according to claim 1, comprising a plurality of the second vent passages each having one said flow control device.

7. The liquid tank system according to claim 6, wherein an end of a first of the plurality of the second vent passages in the main liquid tank is positioned to be above a liquid level when the end of the first vent passage and an end of a second of the plurality of the second vent passages in the main liquid tank are below the liquid level.

8. The liquid tank system according to claim 7, wherein the end of the second of the plurality of the second vent passages in the main liquid tank is positioned to be above a liquid level when the end of the first vent passage and the end of the first of the plurality of the second vent passages in the main liquid are below the liquid level.

9. The liquid tank system according to claim 6, wherein the attitude envelope is divided into two separate ranges of attitudes, and wherein a first of the second vent passages relieves excess pressure in the main liquid tank in one of the ranges of attitudes and a second of the second vent passages relieves excess pressure in the main liquid tank in the other one of the ranges of attitudes when the end of the first vent passage in the main liquid tank is under the liquid level.

10. A method for reducing a gas pressure in a main liquid tank in fluid communication with an auxiliary cavity by a first vent passage and at least a second vent passage, comprising:
    venting the main liquid tank with the first vent passage and blocking the at least one second vent passage with a flow control device when an end of the first vent passage in the main liquid tank is above a liquid level, and
    opening the flow control device to allow gas or liquid flow through the at least one second vent passage when pressure in the main liquid tank is above a pressure threshold and the end of the first vent passage in the main liquid tank is below a liquid level.

11. The method according to claim 10, further comprising allowing liquid flow from the main liquid tank through the first vent passage to the auxiliary cavity when the end of the first vent passage in the main liquid tank is below the liquid level.

12. The method according to claim 11, further comprising allowing liquid flow from the main liquid tank through the at least one second vent passage to the auxiliary cavity when the inlet end of the first vent passage and an inlet end of the at least one second vent passage in the main liquid tank are below the liquid level.

13. The method according to claim 11, further comprising continuously leaving the first vent passage open.

14. The method according to claim 11, wherein the attitude envelope is divided into two separate ranges of attitudes, and further comprising using a first of the second vent passages to relieve excess pressure of the main liquid tank in one of the ranges of attitudes, and using a second of the second vent passages to relieve excess pressure of the main liquid tank in the other one of the ranges of attitudes when the first vent passage is under the liquid level.

15. A liquid tank system comprising:
    a main liquid tank,
    at least an outlet communicating between a fluid circuit and the main liquid tank,
    at least one inlet communicating between the fluid circuit and the main liquid tank,
    an auxiliary cavity,
    a first vent passage communicating between the main liquid tank and the auxiliary cavity configured for liquid and gas to flow at least from the main liquid tank to the auxiliary cavity, and
    at least one second vent passage communicating between the main liquid tank and the auxiliary cavity and configured for liquid and gas to flow at least from the main liquid tank to the auxiliary cavity, the at least one second vent passage having a flow control device configured to regulate flow the at least one second vent passage, the flow control device having a set point at which it allows liquid and gas to flow from the main liquid tank to the auxiliary cavity only when a pressure in the main liquid tank is beyond a threshold, the liquid and gas flowing through the first vent passage below the threshold, wherein the liquid tank system has an attitude envelope in which the liquid tank system, in use, is vented in three modes, a first mode in which the flow control device blocks the at least one second vent passage with when an end of the first vent passage in the main liquid tank is above the liquid level, a second mode in which the flow control device allows gas flow through the at least one second vent passage when the end of the first vent passage in the main liquid tank is below the liquid level, and a third mode in which the flow control device allows liquid flow through the at least one second vent passage when liquid pressure is above the threshold and the end of the first vent passage in the main liquid tank is below the liquid level.

16. The liquid tank system according to claim 15, wherein the first vent passage allows liquid flow from the main liquid tank to the auxiliary cavity in the second mode and the third mode.

17. The liquid tank system according to claim 16, wherein the at least one second vent passage allows liquid flow from the main liquid tank to the auxiliary cavity in the third mode.

18. The liquid tank system according to claim 15, comprising a plurality of the second vent passages.

19. The liquid tank system according to claim 18, wherein an end of a first of the plurality of the second vent passages in the main liquid tank is positioned to be above a liquid level when the end of the first vent passage and an inlet end of a second of the plurality of the second vent passages in the main liquid tank are below the liquid level.

20. The liquid tank system according to claim 18, wherein the attitude envelope is divided into two separate ranges of attitudes, and wherein a first of the second vent passages relieves excess pressure in the main liquid tank in one of the ranges of attitudes and a second of the second vent passages relieves excess pressure in the main liquid tank in the other one of the ranges of attitudes when the end of the first vent passage in the main liquid tank is under the liquid level.

* * * * *